Patented Dec. 6, 1932

1,889,950

UNITED STATES PATENT OFFICE

KENNETH F. COOPER, OF GREAT NECK, NEW YORK, ASSIGNOR TO AMERICAN CYANAMID COMPANY, OF NEW YORK, N. Y., A CORPORATION OF MAINE

FUMIGATION COMPOSITION AND PROCESS

No Drawing.   Application filed April 2, 1930.   Serial No. 441,185.

This invention relates to fumigating compositions as well as a method of using the same, and is more particularly directed to compositions capable of evolving gaseous hydrocyanic acid in toxic concentrations.

In the past, various cyanogen compounds have been suggested for use as insecticides, including the alkali metal cyanides such as potassium or sodium cyanide, alone or in admixture with other substances. However, these cyanides do not decompose with the moisture of the air to a sufficient extent to make them available as fumigants, this being due chiefly to the fact that reaction is arrested by the caustic alkali which is formed by the liberation of the first small amounts of hydrocyanic acid. Therefore, the alkali metal cyanides have been limited to use as stomach poisons, that is, they are effective because the insects or animals eat these cyanide poisons which then act on the system.

In my co-pending application, Serial #641,260, filed May 24, 1923, Patent No. 1,754,148 of April 8, 1930, of which this is a continuation in part, I have described fumigating compositions containing cyanogen compounds and inert materials, which compositions upon exposure to the air cause liberation of a cyanogen gas in toxic concentrations, the inert material remaining behind. The cyanogen compounds used are preferably the alkali earth metal cyanides since these materials readily react with the moisture in the air to produce hydrocyanic acid with sufficient rapidity to be effective as a fumigant. The inert materials described include a wide variety of substances which are inert with respect to the cyanogen compound, although some of the substances may be sufficiently toxic in and of themselves to have insecticidal value.

It is one of the objects of the present invention to provide a composition and a process adapted to fumigation purposes for use in the destruction of animal and insect pests, scale, and the like and which will be superior to those heretofore proposed. It is a further object to provide for the fumigation of trees, shrubs, plants and the like, without the necessity of using tents or other covers, but with the destruction of the pests in a uniform and complete manner. It is a still further object to prevent damage to the vegetation upon which the fumigation composition is used by the use of diluents. Another object of my invention is the provision of a fumigation composition containing diluents which are also toxic agents to control certain pests which may not be completely destroyed by the gases formed in the fumigation process.

These and other objects are attained by preparing a fumigation composition comprising a subdivided mass containing a cyanogen compound which is decomposable by the moisture of the air to liberate hydrocyanic acid gas in toxic concentrations, said mass also containing a substantial proportion of a diluent inert with respect to the cyanide but which material has toxic properties.

As a specific example of one of my compositions, I may mix one part of calcium cyanide with from two to nine parts of sulphur, the whole being preferably ground to an impalpable and uniform powder. This material is dusted on the plant foliage or other surfaces on or near which the pests to be destroyed are located. In the course of a few hours, the cyanide is found to be completely decomposed, due to reaction with the moisture of the air, with the liberation of the entire cyanogen content in the form of hydrocyanic acid gas. The inert sulphur remains behind in its original form and is of considerable and lasting value as an insecticide because of its toxic properties.

My fumigant compositions are susceptible of many variations. For instance, in place of the calcium cyanide mentioned, I may use other cyanogen compounds, particularly the alkali earth metal cyanides, which evolve hydrocyanic acid gas in toxic concentrations. These materials may be in the pure or impure form. For instance, I may use a crude cyanide material of the nature of that disclosed in the U. S. patent to Walter S. Landis, #1,359,257, in which is described the conversion of calcium cyanamid to calcium cyanide by heating the former in the presence of a flux. The resulting product may contain calcium cyanide in amounts in excess of 50%.

The various cyanogen compounds falling within the scope of the present invention may be used singly or in admixture. The relative amounts of the cyanide and sulphur or the like may be such that the cyanide preponderates, and I have used successfully mixtures containing 1 to 3 parts of calcium cyanide to 1 part of sulphur.

In place of sulphur, my compositions may contain other materials which are inert with respect to the cyanogen compound but which are to some degree toxic. These diluents include calcium arsenate, lead arsenate and related arsenicals, tobacco dust and the like. These diluents may be used singly or in admixture and, if desired, other inert ingredients may be used in the fumigant composition. These latter materials serve no other purpose than mere diluents and may include kieselguhr, chalk, talc, clayey materials and the like, and like the other diluents, serve to prevent burning of vegetation and the like.

As has been pointed out, the mechanism of the fumigation process with my compositions involves the evolution of hydrocyanic acid gas in toxic concentrations. The use of my fumigant is not limited to closed compartments and confined spaces. Corps and the like in the open may effectually be treated under the most varied conditions. My method and composition are such that the destruction of the pests will be accomplished with the least possible expenditure of insecticidal material and without damage to objects treated. The compositions are preferably in the form of powder or otherwise finely subdivided since this enables the operator to direct the action of the fumigant to the point where treatment is most needed and in the most economical manner. It also permits of treatment of a portion of a plant or tree without treating the entire plant. Further, due to the fine subdivision of my fumigant composition, toxic concentration is attained in the immediate vicinity of the pests to be combated. This, of course, would not be the case if the same amount of gas were liberated from a few selected and more widely separated points. With low-growing crops, particularly, the use of my fumigant composition effectively destroys the most inaccessible pests by means of the gas liberated from the powder since such powder as may fall on the ground liberates hydrocyanic acid gas which will diffuse through the air, ascend and reach the pests in toxic concentrations.

The fumigant composition is usually applied by means of dusting machines or the like and the diluent permits the mass to be easily forced out of such machines onto the pests or the plants. The amount of fumigant used varies greatly depending upon the nature of the objects to be treated. In being applied to an entire field, it is frequently used in amounts varying from 20 to 55 lbs. per acre. These figures, however, are not universally applicable.

In referring to my diluents as "inert materials", I use this term in a relative sense only since some of the toxic diluents may react to some extent with the cyanogen compound to form various products which are also toxic, in general. For instance, with a mixture of calcium cyanide and sulphur, reaction takes place between these substances to form calcium thiocyanate in greater or lesser amounts, depending upon the conditions to which a mixture is subjected, and in some cases I have found that as much as 50% of the cyanogen present in the mixture may be in the form of the thiocyanate, which also is of a toxic nature.

It is obvious that the details of the process and the composition may be varied widely without departing from the spirit and scope of the invention and therefore I do not wish to be limited to the above disclosure except as may be required by the claims.

What I claim is:—

1. A method of destroying pests which comprises exposing a mass containing calcium cyanide and sulphur to the air to cause liberation of hydrocyanic acid gas in toxic concentrations, said sulphur remaining behind partly in form of calcium thiocyanate.

2. A composition of matter comprising a mixture of sulphur and calcium cyanide, said mixture being capable of evolving gaseous hydrocyanic acid in toxic concentrations and of forming calcium thiocyanate.

3. A composition of matter comprising a mixture of sulphur with calcium cyanide and an inert diluent, said mixture being capable of evolving gaseous hydrocyanic acid in toxic concentrations and of forming calcium thiocyanate.

4. A composition of matter comprising a mixture of one part of calcium cyanide with two to nine parts of sulphur, said mixture being capable of evolving gaseous hydrocyanic acid in toxic concentrations and of forming calcium thiocyanate.

5. A composition of matter comprising a mixture of sulphur and an alkali earth metal cyanide capable of evolving gaseous hydrocyanic acid in toxic concentrations and of forming calcium thiocyanate.

6. A method of destroying pests which comprises exposing to the air a mass containing an alkali earth metal cyanide and sulphur, to cause liberation of hydrocyanic acid gas in toxic concentrations, said sulphur remaining behind partly in form of calcium thiocyanate.

In testimony whereof, I have hereunto subscribed my name this 31 day of March, 1930.

KENNETH F. COOPER.